United States Patent
Zhang

(10) Patent No.: US 8,823,899 B2
(45) Date of Patent: Sep. 2, 2014

(54) LIQUID CRYSTAL DISPLAY DEVICE AND PLASTIC FRAME THEREOF

(75) Inventor: Yan-xue Zhang, Shenzhen (CN)

(73) Assignee: Shenzhen China Star Optoelectronics Technology Co., Ltd., Shenzhen, Guangdong Province (CN)

( * ) Notice: Subject to any disclaimer, the term of this patent is extended or adjusted under 35 U.S.C. 154(b) by 330 days.

(21) Appl. No.: 13/379,353

(22) PCT Filed: Oct. 11, 2011

(86) PCT No.: PCT/CN2011/080658
§ 371 (c)(1),
(2), (4) Date: Dec. 19, 2011

(87) PCT Pub. No.: WO2013/044532
PCT Pub. Date: Apr. 4, 2013

(65) Prior Publication Data
US 2013/0077016 A1    Mar. 28, 2013

(51) Int. Cl.
*G02F 1/1333*    (2006.01)
(52) U.S. Cl.
CPC *G02F 1/133308* (2013.01); *G02F 2001/13314* (2013.01); *F02F 2201/465* (2013.01); *G02F 2001/13332* (2013.01)
USPC ...... 349/60; 349/58; 361/679.22; 361/679.26
(58) Field of Classification Search
USPC ...................... 349/58, 60; 361/679.22, 679.26
See application file for complete search history.

(56) References Cited

U.S. PATENT DOCUMENTS

| 6,654,078 B1 * | 11/2003 | Ogawa et al. ................ 349/58 |
| 2006/0028594 A1 | 2/2006 | Chou |
| 2006/0227499 A1 * | 10/2006 | Jeong et al. ................ 361/681 |
| 2008/0068530 A1 * | 3/2008 | Lee et al. ................ 349/58 |

FOREIGN PATENT DOCUMENTS

| CN | 102096218 A | 6/2011 |
| CN | 201935066 U | 8/2011 |
| JP | 2005-79236 A | 3/2005 |
| JP | 2010-49124 A | 3/2010 |
| KR | 10-2009-0087376 A | 8/2009 |

* cited by examiner

*Primary Examiner* — Michael Caley
(74) *Attorney, Agent, or Firm* — Cheng-Ju Chiang

(57) ABSTRACT

The present invention provides a liquid crystal display device, which includes a front frame and a plastic frame. The plastic frame forms a receiving space. The front frame is received in the receiving space. The plastic frame includes first resilient elements and second resilient elements. The first resilient elements and the second resilient elements resiliently clamp and retain an edge of the front frame. The present invention also provides a plastic frame of liquid crystal display device. With the above arrangement, the liquid crystal display device and the plastic frame thereof use the first resilient elements and the second resilient elements of the plastic frame to clamp an edge of the front frame so as to simplify an assembling operation of the liquid crystal display device, improve manufacturing efficiency, and saving material of the front frame, thereby reducing the manufacturing cost of the liquid crystal display device.

17 Claims, 5 Drawing Sheets

LIQUID CRYSTAL DISPLAY DEVICE AND PLASTIC FRAME THEREOF

BACKGROUND OF THE INVENTION

1. Field of the Invention

The present invention relates to the field of liquid crystal displaying techniques, and in particular to a liquid crystal display device and a plastic frame thereof.

2. The Related Arts

In recent years, due to the advantages of being compact, power saving, and low radiation, liquid crystal display devices find wide applications in all sorts of electronic products, including computer display devices, television sets, notebook computers, mobile phones, and digital cameras.

A liquid crystal display device uses a plastic frame and a front frame to cooperate with each other for retaining a liquid crystal display panel. Generally, the state-of-the-art liquid crystal display devices use bolts to fix the plastic frame and the front frame together, or alternatively, pawl structures are provided on the front frame and the plastic frame and the front frame are fixed together by means of the pawl structures.

The two assembling processes for the state-of-the-art liquid crystal display devices discussed above require the assembling to be done with bolts or pawls. This extends the assembling time and increases labor costs. Further, the material used to make the front frame the manufacturing operation is relatively complicated, leading to an increase of the costs of liquid crystal display panels.

Thus, it is desired to have a liquid crystal display device and a plastic frame thereof that overcome the above discussed problems.

SUMMARY OF THE INVENTION

The present invention aims to address the technical issues of low manufacturing efficiency and high manufacturing cost of liquid crystal display device.

The present invention provides a liquid crystal display device, which comprises a front frame, a plastic frame, and a liquid crystal panel. The plastic frame comprises a sidewall and a support wall extending from the sidewall toward a center of the plastic frame. The sidewall defines a receiving space having a rectangular opening. The front frame is received in the receiving space. The liquid crystal panel is interposed between the front frame and the support wall. The plastic frame comprises first resilient elements and second resilient elements, wherein the first resilient elements are arranged to be spaced from the support wall and extend from the sidewall toward the center of the plastic frame and the second resilient elements are formed on the support wall. The first resilient elements and the second resilient elements resiliently clamp and retain an edge of the front frame.

The present invention provides a liquid crystal display device, which comprises a front frame and a plastic frame. The plastic frame forms a receiving space. The front frame is received in the receiving space. The plastic frame comprises first resilient elements and second resilient elements. The first resilient elements and the second resilient elements resiliently clamp and retain an edge of the front frame.

According to a preferred embodiment of the present invention, the plastic frame comprises a sidewall and a support wall extending from the sidewall toward a center of the plastic frame. The sidewall defines the receiving space that has a rectangular opening. The first resilient elements are arranged to be spaced from the support wall and extend from the sidewall toward the center of the plastic frame. The second resilient elements are formed on the support wall.

According to a preferred embodiment of the present invention, the sidewall comprises a first sidewall portion, a second sidewall portion, a third sidewall portion, and a fourth sidewall portion that are sequentially jointed to each other, wherein the first resilient elements are formed on the first sidewall portion, the second sidewall portion, and the third sidewall portion and the second resilient elements are formed on the support wall corresponding to the first sidewall portion, the second sidewall portion, and the third sidewall portion.

According to a preferred embodiment of the present invention, the front frame comprises a plate-like structure having an opening. The front frame is pushed from the fourth sidewall portion to be received between the first resilient elements and the second resilient elements.

According to a preferred embodiment of the present invention, the liquid crystal display device further comprises a liquid crystal panel, and the liquid crystal panel is interposed and retained between the front frame and the support wall.

According to a preferred embodiment of the present invention, the liquid crystal panel is received in a direction normal to a plane on which the rectangular opening is located into the receiving space and is positioned against the support wall.

According to a preferred embodiment of the present invention, the second resilient elements comprise hook-like flexible members. The hook-like flexible members have an end mounted to the support wall, and the hook-like flexible members have another end bent and pointing the sidewall corresponding to the support wall.

According to a preferred embodiment of the present invention, each of the first resilient elements corresponds to two of the second resilient elements, and the two second resilient elements are located on opposite sides of a projection of the first resilient element on the support wall.

According to a preferred embodiment of the present invention, the first resilient elements comprise flexible plates and the second resilient elements comprise block-like flexible members.

The present invention provides a plastic frame of the liquid crystal display device, which forms a receiving space. The receiving space receives therein a front frame. The plastic frame comprises first resilient elements and second resilient elements. The first resilient elements and the second resilient elements resiliently clamp and retain an edge of the front frame.

According to a preferred embodiment of the present invention, the plastic frame comprises a sidewall and a support wall extending from the sidewall toward a center of the plastic frame. The sidewall defines the receiving space that has a rectangular opening. The first resilient elements are arranged to be spaced from the support wall and extend from the sidewall toward the center of the plastic frame. The second resilient elements are formed on the support wall.

According to a preferred embodiment of the present invention, the sidewall comprises a first sidewall portion, a second sidewall portion, a third sidewall portion, and a fourth sidewall portion that are sequentially jointed to each other, wherein the first resilient elements are formed on the first sidewall portion, the second sidewall portion, and the third sidewall portion and the second resilient elements are formed on the support wall corresponding to the first sidewall portion, the second sidewall portion, and the third sidewall portion.

According to a preferred embodiment of the present invention, the front frame comprises a plate-like structure having an opening. The front frame is pushed from the fourth sidewall portion to be received between the first resilient elements and the second resilient elements.

According to a preferred embodiment of the present invention, the front frame and the support wall interpose and retain a liquid crystal panel therebetween.

According to a preferred embodiment of the present invention, the liquid crystal panel is received in a direction normal to a plane on which the rectangular opening is located into the receiving space and is positioned against the support wall.

According to a preferred embodiment of the present invention, the second resilient elements comprise hook-like flexible members. The hook-like flexible members have an end mounted to the support wall and the hook-like flexible members have another end bent and pointing the sidewall corresponding to the support wall.

According to a preferred embodiment of the present invention, each of the first resilient elements corresponds to two of the second resilient elements, and the two second resilient elements are located on opposite sides of a projection of the first resilient element on the support wall.

According to a preferred embodiment of the present invention, the first resilient elements comprise flexible plates and the second resilient elements comprise block-like flexible members.

The efficacy of the present invention is that to be distinguish from the state of the art, the present invention provides a liquid crystal display device and a plastic frame thereof, which use first resilient elements and second resilient elements formed on the plastic frame to clamp and retain an edge of a front frame so as to simplify an assembling operation of the liquid crystal display device, improve manufacturing efficiency, and save material of the front frame, thereby reducing the manufacturing cost of the liquid crystal display device.

BRIEF DESCRIPTION OF THE DRAWINGS

To make the technical solution of the embodiments according to the present invention, a brief description of the drawings that are necessary for the illustration of the embodiments will be given as follows. Apparently, the drawings described below show only example embodiments of the present invention and for those having ordinary skills in the art, other drawings may be easily obtained from these drawings without paying any creative effort. In the drawings.

DETAILED DESCRIPTION OF THE PREFERRED EMBODIMENTS

Figure 1:
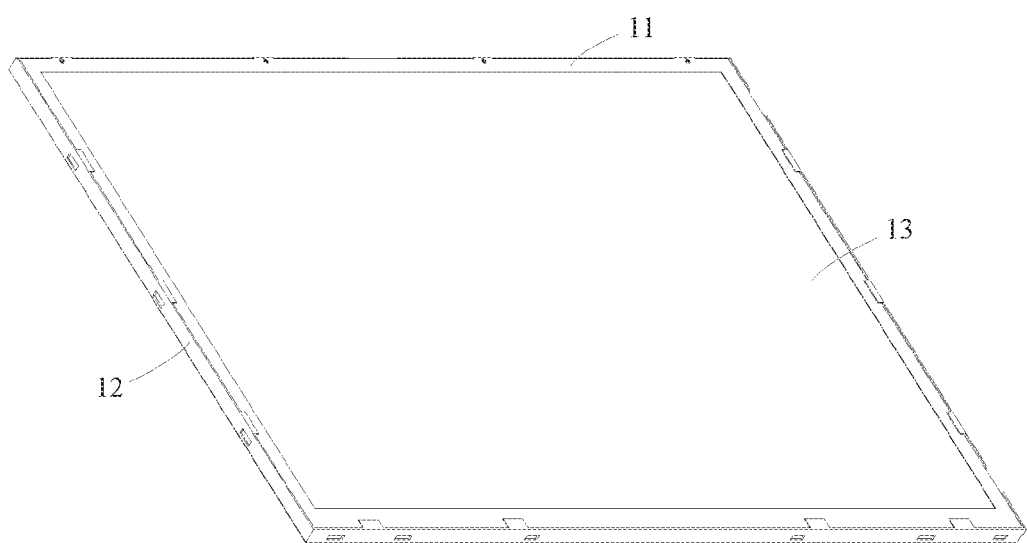
FIG. 1 is a schematic view showing a first embodiment of liquid crystal display device according to the present invention.

Reference is now made to FIG. 1. FIG. 1 is a schematic view showing a first embodiment of liquid crystal display device according to the present invention. As shown in FIG. 1, the liquid crystal display device 10 of the instant embodiment comprises: a front frame 11, a plastic frame 12, a liquid crystal panel 13, and a circuit board (not shown in the drawings) electrically connected to the liquid crystal panel 13. The liquid crystal panel 13 is interposed and retained between the front frame 11 and the plastic frame 12.

Figure 2:
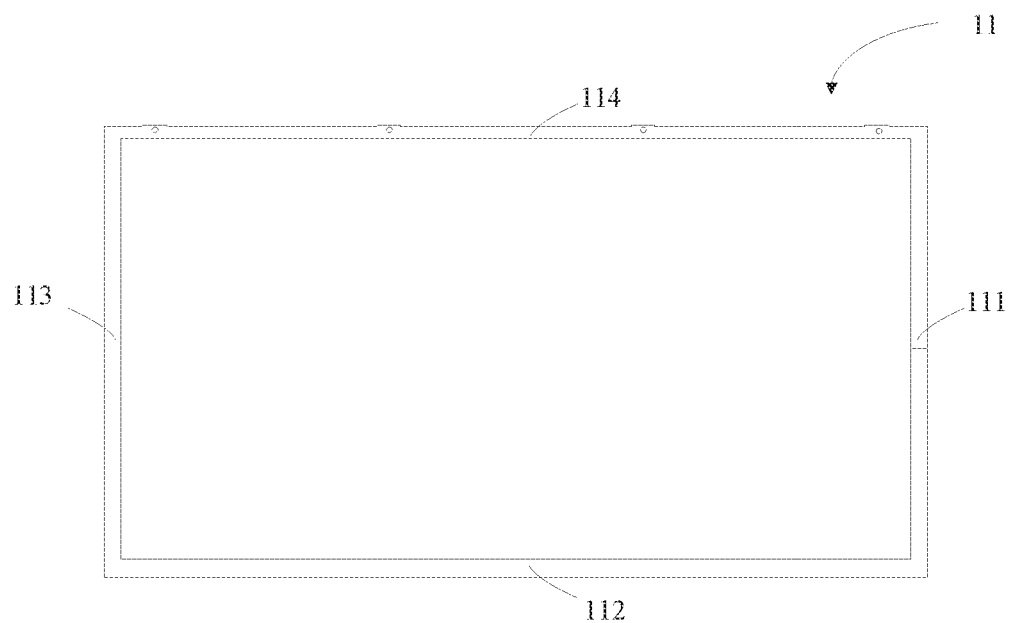
FIG. 2 is a schematic view showing a front frame of the first embodiment of liquid crystal display device according to the present invention.

FIG. 2 is a schematic view showing the front frame of the first embodiment of liquid crystal display device according to the present invention. As shown in FIG. 2, the front frame 11 of the liquid crystal display device 10 of the instant embodiment comprises a plate-like structure having a rectangular opening. The front frame 11 comprises a first side flange 111, a second side flange 112, a third side flange 113, and a fourth side flange 114, in which the fourth side flange 114 that is located close to the circuit board forms a plurality of screw holes (not labeled).

Figure 3:
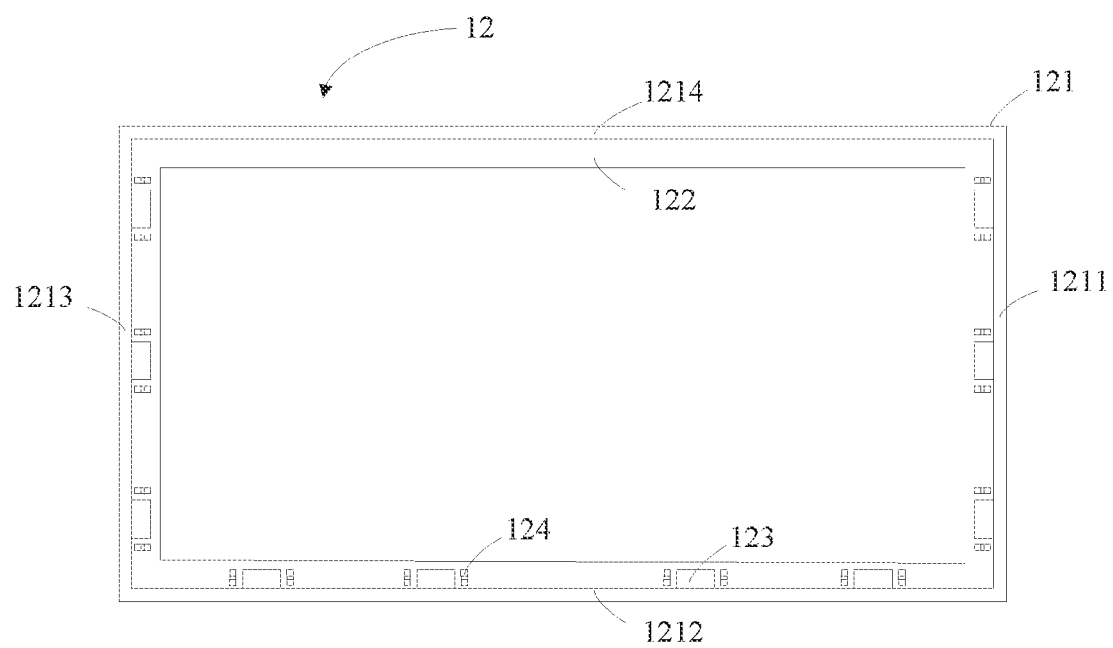
FIG. 3 is a schematic view showing a plastic frame of the first embodiment of liquid crystal display device according to the present invention.
Figure 4:
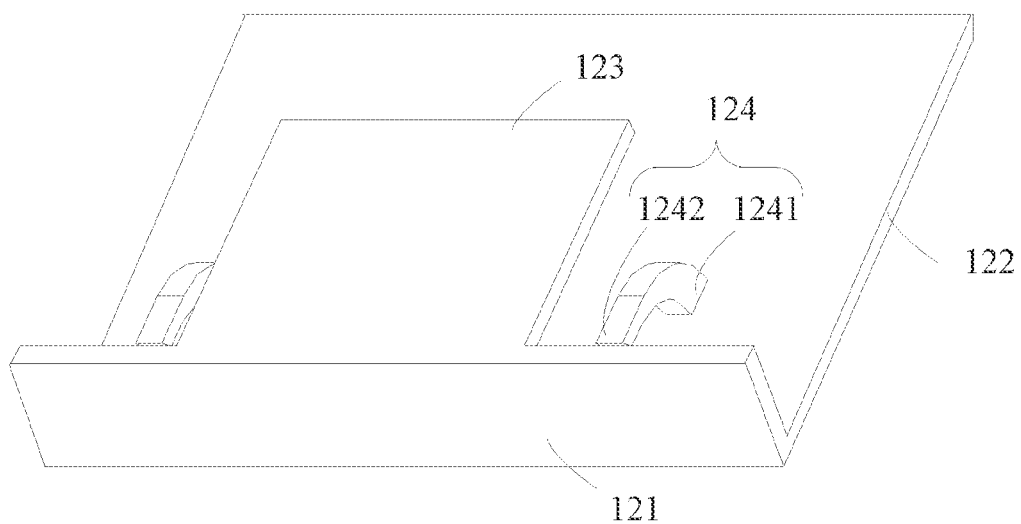
FIG. 4 is a schematic view showing a flexible plate and flexible members of FIG. 3.

Also referring to FIGS. 3 and 4, FIG. 3 is a schematic view showing the plastic frame of the first embodiment of liquid crystal display device according to the present invention and FIG. 4 is a schematic view showing a flexible plate and flexible members of FIG. 3. As shown in FIG. 3, the plastic frame 12 of the liquid crystal display device 10 of the instant embodiment comprises: a sidewall 121, a support wall 122, first resilient elements 123, and second resilient elements 124. The sidewall 121 further defines a receiving space having a rectangular opening. The support wall 122 extends from a bottom of the sidewall 121 in a direction toward a center of the plastic frame 12. The liquid crystal panel 13 is received, in a direction normal to the plane on which the rectangular opening is located, into the receiving space and is positioned against the support wall 122. In a preferred embodiment, the first resilient element 123 comprises a flexible plate, and the second resilient element 124 comprises a flexible member.

As shown in FIG. 4, the flexible plate 123 extends from a top of the sidewall 121 in a direction toward the center of the plastic frame 12 and is arranged to space from the support wall 122 to allow the front frame 11 to be set between the flexible plate 123 and the support wall 122. The flexible members 124 are mounted on the support wall 122 and two flexible members 124 are provided to correspond to each of the flexible plates 123. The two flexible members 124 are located on opposite sides of a projection of the flexible plate 123 on the support wall 122. In the instant embodiment, the flexible member 124 is a hook-like flexible member, wherein the hook-like flexible member 124 has an end 1241 that is fixed to the support wall 122 and the hook-like flexible member 124 has another end 1242 that is bent to point to the sidewall 121 that is associated with the support wall 122.

Further, the sidewall 121 comprises a first sidewall portion 1211, a second sidewall portion 1212, a third sidewall portion 1213, and a fourth sidewall portion 1214 that are sequentially jointed to each other, wherein the flexible plates 123 are mounted to the first sidewall portion 1211, the second sidewall portion 1212, and the third sidewall portion 1213, which are distant from the circuit board, and the flexible members 124 are mounted to the corresponding support wall 122. The front frame 11 is pushed from the fourth sidewall portion 1214 to be received between the flexible plates 123 of the first sidewall portion 1211, the second sidewall portion 1212, and the third sidewall portion 1213 and the flexible members 124 of the corresponding support wall 122.

An assembling operation of the liquid crystal panel 13, the circuit board, and the front frame 11 and the plastic frame 12 will be described as follows in order to make a further explanation of the liquid crystal display device 10 according to the instant embodiment.

First of all, the liquid crystal panel 13 and the circuit board are moved in a direction normal to the plane on which the rectangular opening is located into the receiving space and are set on the support wall 122, so that the circuit board is positioned against the support wall 122 corresponding to the fourth sidewall portion 1214. The second side flange 111 of the front frame 11 is then pushed from the fourth sidewall portion 1214 of the plastic frame 12 to be received between the flexible plates 123 and the flexible members 124 of the first sidewall portion 1211, the second sidewall portion 1212, and the third sidewall portion 1213, whereby the flexible plates 123 and the flexible members 124 of the first sidewall portion 1211, the second sidewall portion 1212, and the third sidewall portion 1213 resiliently clamp and retain edges of the side flanges of the front frame 11, wherein the first side flange 111, the second side flange 112, the third side flange 113, and the fourth side flange 114 respectively oppose the first sidewall portion 1211, the second sidewall portion 1212, the third sidewall portion 1213, and the fourth sidewall portion 1214. Finally, bolts are applied to secure the fourth side flange 114 of the front frame 11 to the support wall 122 corresponding to the fourth sidewall portion 1214.

Figure 5:
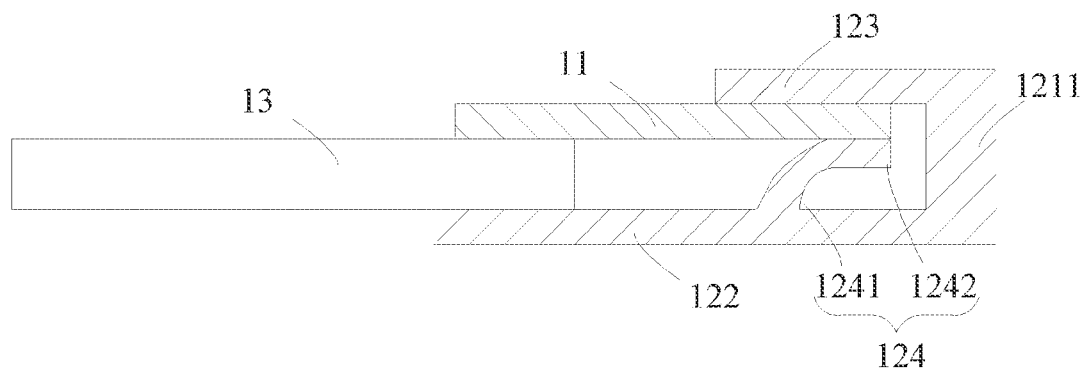
FIG. 5 is a cross-sectional view showing the first embodiment of liquid crystal display device according to the present invention in an assembled form.

Referring to FIG. 5, FIG. 5 is a cross-sectional view showing the first embodiment of liquid crystal display device according to the present invention in an assembled form. As shown in FIG. 5, in a cross-section of the first sidewall portion 1211 of the assembled liquid crystal display device 10, the flexible plates 123 and the flexible members 124 resiliently clamp and retain an edge of the front frame 11 and the liquid crystal panel 13 is interposed and retained between the front frame 11 and the support wall 122 thereby securing the front frame 11 and the liquid crystal panel 13. In the instant embodiment, cross-sections of the second sidewall portion 1212 and the third sidewall portion 1213 of the assembled liquid crystal display device 10 are identical to that of the first sidewall portion 1211.

In the instant embodiment, the fourth side flange 114 of the front frame 11 is secured by bolts to the support wall 122 corresponding to the fourth sidewall portion 1214. In other embodiments, the fourth side flange 114 of the front frame 11 can be secured to the support wall 122 corresponding to the fourth sidewall portion 1214 by other means, such as retention realized through engagement of hook and clasp.

It is noted that in the instant embodiment, the sidewall 121, the support wall 122, the flexible plates 123, and the flexible members 124 are integrally formed together.

To be distinguished from the state-of-the-art liquid crystal display devices, the present invention discloses a liquid crystal display device 10 that provides flexible plates 123 and flexible members 124 on a plastic frame 12 to resiliently clamp and retain an edge of a front frame 11 so as to securely interpose a liquid crystal panel 13 between the front frame 11 and a support wall 122 and thus simplify the assembling operation of the liquid crystal display device 10, improve manufacturing efficiency and save the material of the front frame 11, and reduce the manufacturing cost of the liquid crystal display device 10.

Figure 6:
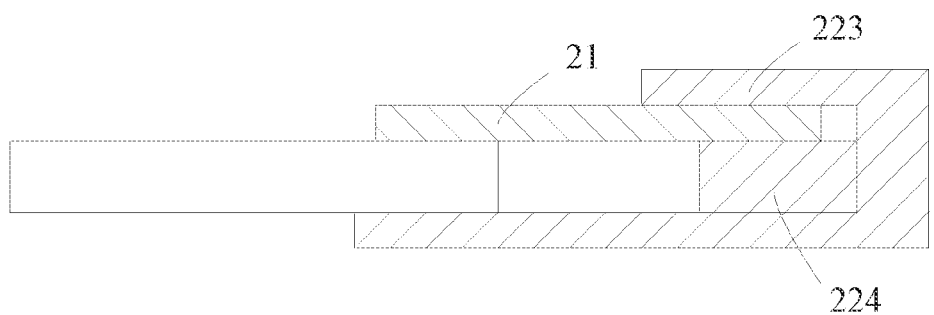
FIG. 6 is a cross-sectional view showing a second embodiment of liquid crystal display device according to the present invention in an assembled form.

Referring to FIG. 6, FIG. 6 is a cross-sectional view showing a second embodiment of liquid crystal display device according to the present invention in an assembled form. As shown in FIG. 6, in the second embodiment of liquid crystal display device according to the present invention, the plastic frame is different from that of first embodiment in that the second resilient element 224 is a block-like flexible member, whereby the first resilient element 223 and the second resilient element 224 resiliently clamp and retain an edge of the front frame 21.

In summary, the present invention provides a liquid crystal display device and a plastic frame thereof, which use first resilient elements and second resilient elements formed on the plastic frame to clamp and retain an edge of a front frame so as to simplify an assembling operation of the liquid crystal display device, improve manufacturing efficiency, and save material of the front frame, thereby reducing the manufacturing cost of the liquid crystal display device.

Embodiments of the present invention have been described, but not to impose any unduly constraint to the appended claims. Any modification of equivalent structure or equivalent process made according to the disclosure and drawings of the present invention, or any application thereof, directly or indirectly, to other related fields of technique, is considered encompassed in the scope of protection defined by the clams of the present invention.

What is claimed is:

1. A liquid crystal display device, wherein the liquid crystal display device comprises a front frame, a plastic frame, and a liquid crystal panel, the plastic frame comprising a sidewall and a support wall extending from the sidewall toward a center of the plastic frame, the sidewall defining a receiving space having a rectangular opening, the front frame being received in the receiving space, the liquid crystal panel being interposed between the front frame and the support wall, the plastic frame comprising first resilient elements and second resilient elements, wherein the first resilient elements are arranged to be spaced from the support wall and extend from the sidewall toward the center of the plastic frame, the second resilient elements being formed on the support wall, the first resilient elements and the second resilient elements resiliently and respectively engaging opposite surfaces of the front frame and thus clamping and retaining an edge of the front frame therebetween, wherein each of the first resilient elements is associated with two of the second resilient elements that are arranged in such a way that the two second resilient elements are located on opposite sides of the first resilient element and not overlapping the first resilient element.

2. A liquid crystal display device, wherein the liquid crystal display device comprises a front frame and a plastic frame, a liquid crystal panel being interposed and retained between the front frame and the support wall, the plastic frame forming a receiving space, the front frame being received in the receiving space, the plastic frame comprising first resilient elements and second resilient elements, the first resilient elements and the second resilient elements resiliently and respectively engaging opposite surfaces of the front frame and thus clamping and retaining an edge of the front frame therebetween, wherein each of the first resilient elements is associated with two of the second resilient elements that are arranged in such a way that the two second resilient elements are located on opposite sides of the first resilient element and not overlapping the first resilient element.

3. The liquid crystal display device as claimed in claim 2, wherein the plastic frame comprises a sidewall and a support wall extending from the sidewall toward a center of the plastic frame, the sidewall defining the receiving space that has a rectangular opening, the first resilient elements being arranged to be spaced from the support wall and extending from the sidewall toward the center of the plastic frame, the second resilient elements being formed on the support wall.

4. The liquid crystal display device as claimed in claim 3, wherein the sidewall comprises a first sidewall portion, a second sidewall portion, a third sidewall portion, and a fourth sidewall portion that are sequentially jointed to each other, wherein the first resilient elements are formed on the first sidewall portion, the second sidewall portion, and the third sidewall portion and the second resilient elements are formed on the support wall corresponding to the first sidewall portion, the second sidewall portion, and the third sidewall portion.

5. The liquid crystal display device as claimed in claim 4, wherein the front frame comprises a plate-like structure having an opening, the front frame being pushed from the fourth sidewall portion to be received between the first resilient elements and the second resilient elements.

6. The liquid crystal display device as claimed in claim 3, wherein the second resilient elements comprise hook-like flexible members, the hook-like flexible members having an end mounted to the support wall, the hook-like flexible members having another end bent and pointing toward the sidewall corresponding to the support wall.

7. The liquid crystal display device as claimed in claim 3, wherein each of the first resilient elements corresponds to two of the second resilient elements, the two second resilient elements being located on opposite sides of a projection of the first resilient element on the support wall.

8. The liquid crystal display device as claimed in claim 2, wherein the liquid crystal panel is received in a direction normal to a plane on which the rectangular opening is located into the receiving space and is positioned against the support wall.

9. The liquid crystal display device as claimed in claim 2, wherein the first resilient elements comprise flexible plates and the second resilient elements comprise block-like flexible members.

10. A plastic frame of a liquid crystal display device, wherein the plastic frame forms a receiving space, the receiving space receiving therein a front frame in such a way that the plastic frame and the front frame adapted to receive a liquid crystal panel to be interposed and clamped therebetween, the plastic frame comprising first resilient elements and second resilient elements, the first resilient elements and the second resilient elements resiliently and respectively engaging opposite surfaces of the front frame and thus clamping and retaining an edge of the front frame therebetween, wherein each of the first resilient elements is associated with two of the second resilient elements that are arranged in such a way that the two second resilient elements are located on opposite sides of the first resilient element and not overlapping the first resilient element.

11. The plastic frame as claimed in claim 10, wherein the plastic frame comprises a sidewall and a support wall extending from the sidewall toward a center of the plastic frame, the sidewall defining the receiving space that has a rectangular opening, the first resilient elements being arranged to be spaced from the support wall and extending from the sidewall toward the center of the plastic frame, the second resilient elements being formed on the support wall.

12. The plastic frame as claimed in claim 11, wherein the sidewall comprises a first sidewall portion, a second sidewall portion, a third sidewall portion, and a fourth sidewall portion that are sequentially jointed to each other, wherein the first resilient elements are formed on the first sidewall portion, the second sidewall portion, and the third sidewall portion and the second resilient elements are formed on the support wall corresponding to the first sidewall portion, the second sidewall portion, and the third sidewall portion.

13. The plastic frame as claimed in claim 12, wherein the front frame comprises a plate-like structure having an opening, the front frame being pushed from the fourth sidewall portion to be received between the first resilient elements and the second resilient elements.

14. The plastic frame as claimed in claim 11, wherein the second resilient elements comprise hook-like flexible members, the hook-like flexible members having an end mounted to the support wall, the hook-like flexible members having another end bent and pointing toward the sidewall corresponding to the support wall.

15. The plastic frame as claimed in claim 11, wherein each of the first resilient elements corresponds to two of the second resilient elements, the two second resilient elements being located on opposite sides of a projection of the first resilient element on the support wall.

16. The plastic frame as claimed in claim 10, wherein the liquid crystal panel is received in a direction normal to a plane on which the rectangular opening is located into the receiving space and is positioned against the support wall.

17. The plastic frame as claimed in claim 10, wherein the first resilient elements comprise flexible plates and the second resilient elements comprise block-like flexible members.

* * * * *